(12) United States Patent
Freund et al.

(10) Patent No.: US 8,531,472 B2
(45) Date of Patent: Sep. 10, 2013

(54) SYSTEMS AND METHODS FOR RAPID THREE-DIMENSIONAL MODELING WITH REAL FAÇADE TEXTURE

(75) Inventors: Joseph G. Freund, Rishon Le-Zion (IL); Ran Gal, Rishon Le-Zion (IL)

(73) Assignees: Pictometry International Corp., Rochester, NY (US); Idan Computers Engineering (1979) Ltd., Azor (IL)

( * ) Notice: Subject to any disclaimer, the term of this patent is extended or adjusted under 35 U.S.C. 154(b) by 1084 days.

(21) Appl. No.: 11/998,974

(22) Filed: Dec. 3, 2007

(65) Prior Publication Data

US 2009/0141020 A1 Jun. 4, 2009

(51) Int. Cl.
*G09G 5/00* (2006.01)

(52) U.S. Cl.
USPC ............... 345/582; 345/581; 345/619

(58) Field of Classification Search
USPC ............... 382/154, 284; 345/419; 356/141.5
See application file for complete search history.

(56) References Cited

U.S. PATENT DOCUMENTS

| | | | |
|---|---|---|---|
| 2,273,876 A | 2/1942 | Lutz et al. | |
| 3,153,784 A | 10/1964 | Petrides et al. | |
| 3,594,556 A | 7/1971 | Edwards | |
| 3,614,410 A | 10/1971 | Bailey | |
| 3,621,326 A | 11/1971 | Hobrough | |
| 3,661,061 A | 5/1972 | Tokarz | |
| 3,716,669 A | 2/1973 | Watanabe et al. | |
| 3,725,563 A | 4/1973 | Woycechowsky | |
| 3,864,513 A | 2/1975 | Halajian et al. | |
| 3,866,602 A | 2/1975 | Furihata | |
| 3,877,799 A | 4/1975 | O'Donnell | |
| 4,015,080 A | 3/1977 | Moore-Searson | |
| 4,044,879 A | 8/1977 | Stahl | |
| 4,184,711 A | 1/1980 | Wakimoto | |
| 4,240,108 A | 12/1980 | Levy | |
| 4,281,354 A | 7/1981 | Conte | |
| 4,344,683 A | 8/1982 | Stemme | |
| 4,360,876 A | 11/1982 | Girault et al. | |

(Continued)

FOREIGN PATENT DOCUMENTS

| AT | 331204 T | 7/2006 |
|---|---|---|
| AU | 9783798 | 4/1999 |

(Continued)

OTHER PUBLICATIONS

Rasmussen, C.; Korah, T.; , "Spatiotemporal inpainting for recovering texture maps of partially occluded building facades," Image Processing, 2005. ICIP 2005. IEEE International Conference on , vol. 3, no., pp. III-125-8, Sep. 11-14, 2005 doi: 10.1109/ICIP.2005.1530344 URL: http://ieeexplore.ieee.org/stamp/stamp.jsp?tp=&arnumber=1530344&isnumber=32.*

(Continued)

*Primary Examiner* — Phi Hoang
(74) *Attorney, Agent, or Firm* — Dunlap Codding, P.C.

(57) ABSTRACT

Methods are described for automatically generating a three-dimensional model of a structure including real façade textures obtained from geo-referenced oblique images. The geographical position of at least one real façade texture is located. Geo-referenced images containing the real façade texture are located. A base image having the real façade texture is selected from the geo-referenced images by analyzing image raster content. The real façade texture of the base image is applied to the three-dimensional model. Systems for generating the three-dimensional model are also described herein.

17 Claims, 9 Drawing Sheets

(56) References Cited

U.S. PATENT DOCUMENTS

| | | |
|---|---|---|
| 4,382,678 A | 5/1983 | Thompson et al. |
| 4,387,056 A | 6/1983 | Stowe |
| 4,396,942 A | 8/1983 | Gates |
| 4,463,380 A | 7/1984 | Hooks |
| 4,489,322 A | 12/1984 | Zulch et al. |
| 4,490,742 A | 12/1984 | Wurtzinger |
| 4,491,399 A | 1/1985 | Bell |
| 4,495,500 A | 1/1985 | Vickers |
| 4,527,055 A | 7/1985 | Harkless et al. |
| 4,543,603 A | 9/1985 | Laures |
| 4,586,138 A | 4/1986 | Mullenhoff et al. |
| 4,635,136 A | 1/1987 | Ciampa et al. |
| 4,653,136 A | 3/1987 | Denison |
| 4,653,316 A | 3/1987 | Fukuhara |
| 4,673,988 A | 6/1987 | Jansson et al. |
| 4,686,474 A | 8/1987 | Olsen et al. |
| 4,688,092 A | 8/1987 | Kamel et al. |
| 4,689,748 A | 8/1987 | Hofmann |
| 4,707,698 A | 11/1987 | Constant et al. |
| 4,758,850 A | 7/1988 | Archdale et al. |
| 4,805,033 A | 2/1989 | Nishikawa |
| 4,807,024 A | 2/1989 | Mclaurin et al. |
| 4,814,711 A | 3/1989 | Olsen et al. |
| 4,814,896 A | 3/1989 | Heitzman et al. |
| 4,843,463 A | 6/1989 | Michetti |
| 4,899,296 A | 2/1990 | Khattak |
| 4,906,198 A | 3/1990 | Cosimano et al. |
| 4,953,227 A | 8/1990 | Katsuma et al. |
| 4,956,872 A | 9/1990 | Kimura |
| 5,034,812 A | 7/1991 | Rawlings |
| 5,086,314 A | 2/1992 | Aoki et al. |
| 5,121,222 A | 6/1992 | Endoh et al. |
| 5,138,444 A | 8/1992 | Hiramatsu |
| 5,155,597 A | 10/1992 | Lareau et al. |
| 5,164,825 A | 11/1992 | Kobayashi et al. |
| 5,166,789 A | 11/1992 | Myrick |
| 5,191,174 A | 3/1993 | Chang et al. |
| 5,200,793 A | 4/1993 | Ulich et al. |
| 5,210,586 A | 5/1993 | Grage et al. |
| 5,231,435 A | 7/1993 | Blakely |
| 5,247,356 A | 9/1993 | Ciampa |
| 5,251,037 A | 10/1993 | Busenberg |
| 5,265,173 A | 11/1993 | Griffin et al. |
| 5,267,042 A | 11/1993 | Tsuchiya et al. |
| 5,270,756 A | 12/1993 | Busenberg |
| 5,296,884 A | 3/1994 | Honda et al. |
| 5,335,072 A | 8/1994 | Tanaka et al. |
| 5,342,999 A | 8/1994 | Frei et al. |
| 5,345,086 A | 9/1994 | Bertram |
| 5,353,055 A | 10/1994 | Hiramatsu |
| 5,369,443 A | 11/1994 | Woodham |
| 5,402,170 A | 3/1995 | Parulski et al. |
| 5,414,462 A | 5/1995 | Veatch |
| 5,467,271 A | 11/1995 | Abel et al. |
| 5,481,479 A | 1/1996 | Wight et al. |
| 5,486,948 A | 1/1996 | Imai et al. |
| 5,506,644 A | 4/1996 | Suzuki et al. |
| 5,508,736 A | 4/1996 | Cooper |
| 5,555,018 A | 9/1996 | von Braun |
| 5,604,534 A | 2/1997 | Hedges et al. |
| 5,617,224 A | 4/1997 | Ichikawa et al. |
| 5,633,946 A | 5/1997 | Lachinski et al. |
| 5,668,593 A | 9/1997 | Lareau et al. |
| 5,677,515 A | 10/1997 | Selk et al. |
| 5,798,786 A | 8/1998 | Lareau et al. |
| 5,835,133 A | 11/1998 | Moreton et al. |
| 5,841,574 A | 11/1998 | Willey |
| 5,844,602 A | 12/1998 | Lareau et al. |
| 5,852,753 A | 12/1998 | Lo et al. |
| 5,894,323 A | 4/1999 | Kain et al. |
| 5,899,945 A | 5/1999 | Baylocq et al. |
| 5,963,664 A | 10/1999 | Kumar et al. |
| 6,088,055 A | 7/2000 | Lareau et al. |
| 6,094,215 A | 7/2000 | Sundahl et al. |
| 6,097,854 A | 8/2000 | Szeliski et al. |
| 6,108,032 A | 8/2000 | Hoagland |
| 6,130,705 A | 10/2000 | Lareau et al. |
| 6,157,747 A | 12/2000 | Szeliski et al. |
| 6,167,300 A | 12/2000 | Cherepenin et al. |
| 6,222,583 B1 | 4/2001 | Matsumura et al. |
| 6,236,886 B1 | 5/2001 | Cherepenin et al. |
| 6,256,057 B1 | 7/2001 | Mathews et al. |
| 6,373,522 B2 | 4/2002 | Mathews et al. |
| 6,421,610 B1 | 7/2002 | Carroll et al. |
| 6,434,280 B1 | 8/2002 | Peleg et al. |
| 6,597,818 B2 | 7/2003 | Kumar et al. |
| 6,639,596 B1 | 10/2003 | Shum et al. |
| 6,711,475 B2 | 3/2004 | Murphy |
| 6,731,329 B1 | 5/2004 | Feist et al. |
| 6,747,686 B1 | 6/2004 | Bennett |
| 6,834,128 B1 | 12/2004 | Altunbasak et al. |
| 6,876,763 B2 | 4/2005 | Sorek et al. |
| 7,009,638 B2 | 3/2006 | Gruber et al. |
| 7,018,050 B2 | 3/2006 | Ulichney et al. |
| 7,046,401 B2 | 5/2006 | Dufaux et al. |
| 7,061,650 B2 | 6/2006 | Walmsley et al. |
| 7,065,260 B2 | 6/2006 | Zhang et al. |
| 7,123,382 B2 | 10/2006 | Walmsley et al. |
| 7,127,348 B2 | 10/2006 | Smitherman et al. |
| 7,142,984 B2 | 11/2006 | Rahmes et al. |
| 7,233,691 B2 | 6/2007 | Setterholm |
| 7,262,790 B2 | 8/2007 | Bakewell |
| 7,663,636 B2* | 2/2010 | Kim et al. ............ 345/581 |
| 2002/0041328 A1 | 4/2002 | LeCompte et al. |
| 2002/0041717 A1 | 4/2002 | Murata et al. |
| 2002/0114536 A1 | 8/2002 | Xiong et al. |
| 2003/0014224 A1 | 1/2003 | Guo et al. |
| 2003/0043824 A1 | 3/2003 | Remboski et al. |
| 2003/0088363 A1 | 5/2003 | Melero et al. |
| 2003/0214585 A1 | 11/2003 | Bakewell |
| 2004/0105090 A1* | 6/2004 | Schultz et al. ............ 356/141.5 |
| 2004/0167709 A1 | 8/2004 | Smitherman et al. |
| 2005/0024378 A1* | 2/2005 | Pearce et al. ............ 345/587 |
| 2005/0073241 A1 | 4/2005 | Yamauchi et al. |
| 2005/0088251 A1 | 4/2005 | Matsumoto |
| 2005/0169521 A1 | 8/2005 | Hel-Or |
| 2005/0209774 A1 | 9/2005 | Finlay |
| 2005/0265631 A1 | 12/2005 | Mai et al. |
| 2006/0028550 A1 | 2/2006 | Palmer et al. |
| 2006/0061566 A1* | 3/2006 | Verma et al. ............ 345/419 |
| 2006/0092043 A1 | 5/2006 | Lagassey |
| 2006/0110026 A1* | 5/2006 | Strassenburg-Kleciak et al. ............ 382/154 |
| 2006/0238383 A1 | 10/2006 | Kimchi et al. |
| 2006/0250515 A1 | 11/2006 | Koseki et al. |
| 2007/0024612 A1 | 2/2007 | Balfour |
| 2007/0046448 A1 | 3/2007 | Smitherman |
| 2007/0237420 A1* | 10/2007 | Steedly et al. ............ 382/284 |
| 2008/0120031 A1 | 5/2008 | Rosenfeld et al. |
| 2008/0123994 A1 | 5/2008 | Schultz et al. |

FOREIGN PATENT DOCUMENTS

| | | |
|---|---|---|
| AU | 3874400 | 9/2000 |
| AU | 03/291364 | 6/2004 |
| BR | 0316110 | 9/2005 |
| CA | 2402234 | 9/2000 |
| CA | 2505566 | 5/2004 |
| CN | 1735897 A | 2/2006 |
| DE | 60017384 T | 3/2006 |
| DE | 60306301 T | 11/2006 |
| DK | 1418402 T | 10/2006 |
| EP | 1180967 | 2/2002 |
| EP | 1418402 | 5/2004 |
| EP | 1696204 | 8/2006 |
| ES | 2266704 T | 3/2007 |
| HK | 1088421 A | 11/2006 |
| JP | 2003/317089 A | 11/2003 |
| JP | 2006505794 T | 2/2006 |
| MX | PA05004987 | 2/2006 |
| SG | 2005/03341 | 5/2007 |
| WO | WO99/18732 | 4/1999 |
| WO | WO/00/53090 | 9/2000 |
| WO | WO/2004/044692 | 5/2004 |
| WO | WO/2005/088251 | 9/2005 |

| WO | WO/2008/028040 | 3/2008 |
| WO | PCT/US08/85410 | 2/2009 |
| WO | PCT/US09/052776 | 3/2010 |
| WO | PCT/US08/085410 | 6/2010 |

OTHER PUBLICATIONS

Ackermann, Prospects of Kinematic GPS Aerial Triangulation, ITC Journal, 1992.
Ciampa, John A., "Pictometry Digital Video Mapping", SPIE, vol. 2598, pp. 140-148, 1995.
Ciampa, J. A., Oversee, Presented at Reconstruction After Urban earthquakes, Buffalo, NY, 1989.
Dunford et al., Remote Sensing for Rural Development Planning in Africa, The Journal for the International Institute for Aerial Survey and Earth Sciences, 2:99-108, 1983.
Gagnon, P.A., Agnard, J. P., Nolette, C., & Boulianne, M., "A Micro-Computer based General Photogrammetric System", Photogrammetric Engineering and Remote Sensing, vol. 56, No. 5., pp. 623-625, 1990.
Konecny, G., "Issues of Digital Mapping", Leibniz University Hannover, Germany, GIS Ostrava 2008, Ostrava Jan. 27-30, 2008, pp. 1-8.
Konecny, G., "Analytical Aerial Triangulation with Convergent Photography", Department of Surveying Engineering, University of New Brunswick, pp. 37-57, 1966.
Konecny, G., "Interior Orientation and Convergent Photography", Photogrammetric Engineering, pp. 625-634, 1965.
Graham, Lee A., "Airborne Video for Near-Real-Time Vegetation Mapping", Journal of Forestry, 8:28-32, 1993.
Graham, Horita TRG-50 SMPTE Time-Code Reader, Generator, Window Inserter, 1990.
Hess, L.L, et al., "Geocoded Digital Videography for Validation of Land Cover Mapping in the Amazon Basin", International Journal of Remote Sensing, vol. 23, No. 7, pp. 1527-1555, 2002.
Hinthorne, J., et al., "Image Processing in the Grass GIS", Geoscience and Remote Sensing Symposium, 4:2227-2229, 1991.
Imhof, Ralph K., "Mapping from Oblique Photographs", Manual of Photogrammetry, Chapter 18.
Jensen, John R., Introductory Digital Image Processing: A Remote Sensing Perspective, Prentice-Hall, 1986; 399 pages.
Lapine, Lewis A., "Practical Photogrammetric Control by Kinematic GPS", GPS World, 1(3):44-49, 1990.
Lapine, Lewis A., Airborne Kinematic GPS Positioning for Photogrammetry—The Determination of the Camera Exposure Station, Silver Spring, MD, 11 pages, at least as early as 2000.
Linden et al., Airborne Video Automated Processing, US Forest Service Internal report, Fort Collins, CO, 1993.
Myhre, Dick, "Airborne Video System Users Guide", USDA Forest Service, Forest Pest Management Applications Group, published by Management Assistance Corporation of America, 6 pages, 1992.
Myhre et al., "An Airborne Video System Developed Within Forest Pest Management—Status and Activities", 10 pages, 1992.
Myhre et al., "Airborne Videography—A Potential Tool for Resource Managers"—Proceedings: Resource Technology 90, 2nd International Symposium on Advanced Technology in Natural Resource Management, 5 pages, 1990.
Myhre et al., Aerial Photography for Forest Pest Management, Proceedings of Second Forest Service Remote Sensing Applications Conference, Slidell, Louisiana, 153-162, 1988.
Myhre et al., "Airborne Video Technology", Forest Pest Management/Methods Application Group, Fort Collins, CO, pp. 1-6, at least as early as Jul. 30, 2006.
Norton-Griffiths et al., 1982. "Sample surveys from light aircraft combining visual observations and very large scale color photography". University of Arizona Remote Sensing Newsletter 82-2:1-4.
Norton-Griffiths et al., "Aerial Point Sampling for Land Use Surveys", Journal of Biogeography, 15:149-156, 1988.
Novak, Rectification of Digital Imagery, Photogrammetric Engineering and Remote Sensing, 339-344, 1992.
Slaymaker, Dana M., "Point Sampling Surveys with GPS-logged Aerial Videography", Gap Bulletin No. 5, University of Idaho, http://www.gap.uidaho.edu/Bulletins/5/PSSwGPS.html, 1996.
Slaymaker, et al., "Madagascar Protected Areas Mapped with GPS-logged Aerial Video and 35mm Air Photos", Earth Observation magazine, vol. 9, No. 1, http://www.eomonline.com/Common/Archives/2000jan/00jan_tableofcontents.html, pp. 1-4, 2000.
Slaymaker, et al., "Cost-effective Determination of Biomass from Aerial Images", Lecture Notes in Computer Science, 1737:67-76, http://portal.acm.org/citation.cfm?id=648004.743267&coll=Guide&dl=, 1999.
Slaymaker, et al., "A System for Real-time Generation of Geo-referenced Terrain Models", 4232A-08, SPIE Enabling Technologies for Law Enforcement Boston, MA, ftp://vis-ftp.cs.umass.edu/Papers/schultz/spie2000.pdf, 2000.
Slaymaker, et al.,"Integrating Small Format Aerial Photography, Videography, and a Laser Profiler for Environmental Monitoring", in ISPRS WG III/1 Workshop on Integrated Sensor Calibration and Orientation, Portland, Maine, 1999.
Slaymaker, et al., "Calculating Forest Biomass With Small Format Aerial Photography, Videography And A Profiling Laser", In Proceedings of the 17th Biennial Workshop on Color Photography and Videography in Resource Assessment, Reno, NV, 1999.
Slaymaker et al., Mapping Deciduous Forests in Southern New England using Aerial Videography and Hyperclustered Multi-Temporal Landsat TM Imagery, Department of Forestry and Wildlife Management, University of Massachusetts.
Star et al., "Geographic Information Systems an Introduction", Prentice-Hall, 1990.
Tomasi et al., "Shape and Motion from Image Streams: a Factorization Method"—Full Report on the Orthographic Case, pp. 9795-9802, 1992.
Warren, Fire Mapping with the Fire Mousetrap, Aviation and Fire Management, Advanced Electronics System Development Group, USDA Forest Service, 1986.
Welch, R., "Desktop Mapping with Personal Computers", Photogrammetric Engineering and Remote Sensing, 1651-1662, 1989.
Westervelt, James, "Introduction to GRASS 4", pp. 1-25, 1991.
"RGB Spectrum Videographics Report, vol. 4, No. 1, McDonnell Douglas Integrates RGB Spectrum Systems in Helicopter Simulators", pp. 1-6, 1995.
RGB "Computer Wall", RGB Spectrum, 4 pages, 1995.
"The First Scan Converter with Digital Video Output", Introducing . . . The RGB/Videolink 1700D-1, RGB Spectrum, 2 pages, 1995.
ERDAS Field Guide, Version 7.4, A Manual for a commercial image processing system, 1990.
"Image Measurement and Aerial Photography", Magazine for all branches of Photogrammetry and its fringe areas, Organ of the German Photogrammetry Association, Berlin-Wilmersdorf, No. 1, 1958.
"Airvideo Analysis", MicroImages, Inc., Lincoln, NE, 1 page, Dec. 1992.
Zhu, Zhigang, Hanson, Allen R., "Mosaic-Based 3D Scene Representation and Rendering", Image Processing, 2005, ICIP 2005, IEEE International Conference on 1(2005).
Mostafa, et al., "Direct Positioning and Orientation Systems How do they Work? What is the Attainable Accuracy?", Proceeding, American Society of Photogrammetry and Remote Sensing Annual Meeting, St. Louis, MO, Apr. 24-27, 2001.
"POS AV" georeferenced by APPLANIX aided inertial technology, http://www.applanix.com/products/posav_index.php.
Mostafa, et al., "Ground Accuracy from Directly Georeferenced Imagery", Published in GIM International vol. 14 N. Dec. 12, 2000.
Mostafa, et al., "Airborne Direct Georeferencing of Frame Imagery: An Error Budget", The $3^{rd}$ International Symposium on Mobile Mapping Technology, Cairo, Egypt, Jan. 3-5, 2001.
Mostafa, M.R. and Hutton, J., "Airborne Kinematic Positioning and Attitude Determination Without Base Stations", Proceedings, International Symposium on Kinematic Systems in Geodesy, Geomatics, and Navigation (KIS 2001) Banff, Alberta, Canada, Jun. 4-8, 2001.
Mostafa, et al., "Airborne DGPS Without Dedicated Base Stations for Mapping Applications", Proceedings of ION-GPS 2001, Salt Lake City, Utah, USA, Sep. 11-14.

Mostafa, "ISAT Direct Exterior Orientation QA/QC Strategy Using POS Data", Proceedings of OEEPE Workshop: Integrated Sensor Orientation, Hanover, Germany, Sep. 17-18, 2001.

Mostafa, "Camera/IMU Boresight Calibration: New Advances and Performance Analysis", Proceedings of the ASPRS Annual Meeting, Washington, D.C., Apr. 21-26, 2002.

Hiatt, "Sensor Integration Aids Mapping at Ground Zero", Photogrammetric Engineering and Remote Sensing, Sep. 2002, p. 877-878.

Mostafa, "Precision Aircraft GPS Positioning Using CORS", Photogrammetric Engineering and Remote Sensing, Nov. 2002, p. 1125-1126.

Mostafa, et al., System Performance Analysis of INS/DGPS Integrated System for Mobile Mapping System (MMS), Department of Geomatics Engineering, University of Calgary, Commission VI, WG VI/4.

Artes F., & Hutton, J., "GPS and Inertial Navigation Delivering", Sep. 2005, GEOconnexion International Magazine, p. 52-53.

"POS AV" APPLANIX, Product Outline, airborne@applanix.com, 3 pages.

POSTrack, "Factsheet", APPLANIX, Ontario, Canada, www.applanix.com.

POS AV "Digital Frame Camera Applications", 3001 Inc., Brochure, 2007.

POS AV "Digital Scanner Applications", Earthdata Brochure.

POS AV "Film Camera Applications" AeroMap Brochure.

POS AV "LIDAR Applications" MD Atlantic Brochure.

POS AV "OEM System Specifications", 2005.

POS AV "Synthetic Aperture Radar Applications", Overview, Orbisat Brochure.

"POSTrack V5 Specifications" 2005.

"Remote Sensing for Resource Inventory Planning and Monitoring", Proceeding of the Second Forest Service Remote Sensing Applications Conference—Slidell, Louisiana and NSTL, Mississippi, Apr. 11-15, 1988.

"Protecting Natural Resources with Remote Sensing", Proceeding of the Third Forest Service Remote Sensing Applications Conference—Apr. 9-13, 1990.

Heipke, et al, "Test Goals and Test Set Up for the OEEPE Test—Integrated Sensor Orientation", 1999.

Kumar, et al., "Registration of Video to Georeferenced Imagery", Sarnoff Corporation, CN5300, Princeton, NJ, 1998.

McConnel, Proceedings Aerial Pest Detection and Monitoring Workshop—1994.pdf, USDA Forest Service Forest Pest Management, Northern Region, Intermountain regiion, Forest Insects and Diseases, Pacific Northwest Region.

"Standards for Digital Orthophotos ", National Mapping Program Technical Instructions, US Department of the Interior, Dec. 1996.

Tao, "Mobile Mapping Technology for Road Network Data Acquisition", Journal of Geospatial Engineering, vol. 2, No. 2, pp. 1-13, 2000.

"Mobile Mapping Systems Lesson 4", Lesson 4 SURE 382 Geographic Information Systems II, pp. 1-29, Jul. 2, 2006.

Konecny, G., "Mechanische Radialtriangulation mit Konvergentaufnahmen", Bildmessung und Luftbildwesen, 1958, Nr. 1.

Myhre, "ASPRS/ACSM/RT 92" Technical papers, Washington, D.C., vol. 5 Resource Technology 92, Aug. 3-8, 1992.

Rattigan, "Towns get new view from above," *The Boston Globe,* Sep. 5, 2002.

Mostafa, et al., "Digital image georeferencing from a multiple camera system by GPS/INS," *ISP RS Journal of Photogrammetry & Remote Sensing,* 56(I): 1-12, Jun. 2001.

Dillow, "Grin, or bare it, for aerial shot," *Orange County Register* (California), Feb. 25, 2001.

Anonymous, "Live automatic coordinates for aerial images," *Advanced Imaging,* 12(6):51, Jun. 1997.

Anonymous, "Pictometry and US Geological Survey announce—Cooperative Research and Development Agreement," Press Release published Oct. 20, 1999.

Miller, "Digital software gives small Arlington the Big Picture," *Government Computer News State & Local,* 7(12), Dec. 2001.

Garrett, "Pictometry: Aerial photography on steroids," *Law Enforcement Technology* 29(7):114-116, Jul. 2002.

Weaver, "County gets an eyeful," *The Post-Standard* (Syracuse, NY), May 18, 2002.

Reed, "Firm gets latitude to map O.C. in 3D," *Orange County Register* (California), Sep. 27, 2000.

Reyes, "Orange County freezes ambitious aerial photography project," *Los Angeles Times,* Oct. 16, 2000.

Mikhail, Edward M., "Multi-source Feature Extraction and Visualization in Urban Environment," International Archives of Photogrammetry and Remote Sensing, vol. XXXIII, Part B3. Amsterdam 2000.

* cited by examiner

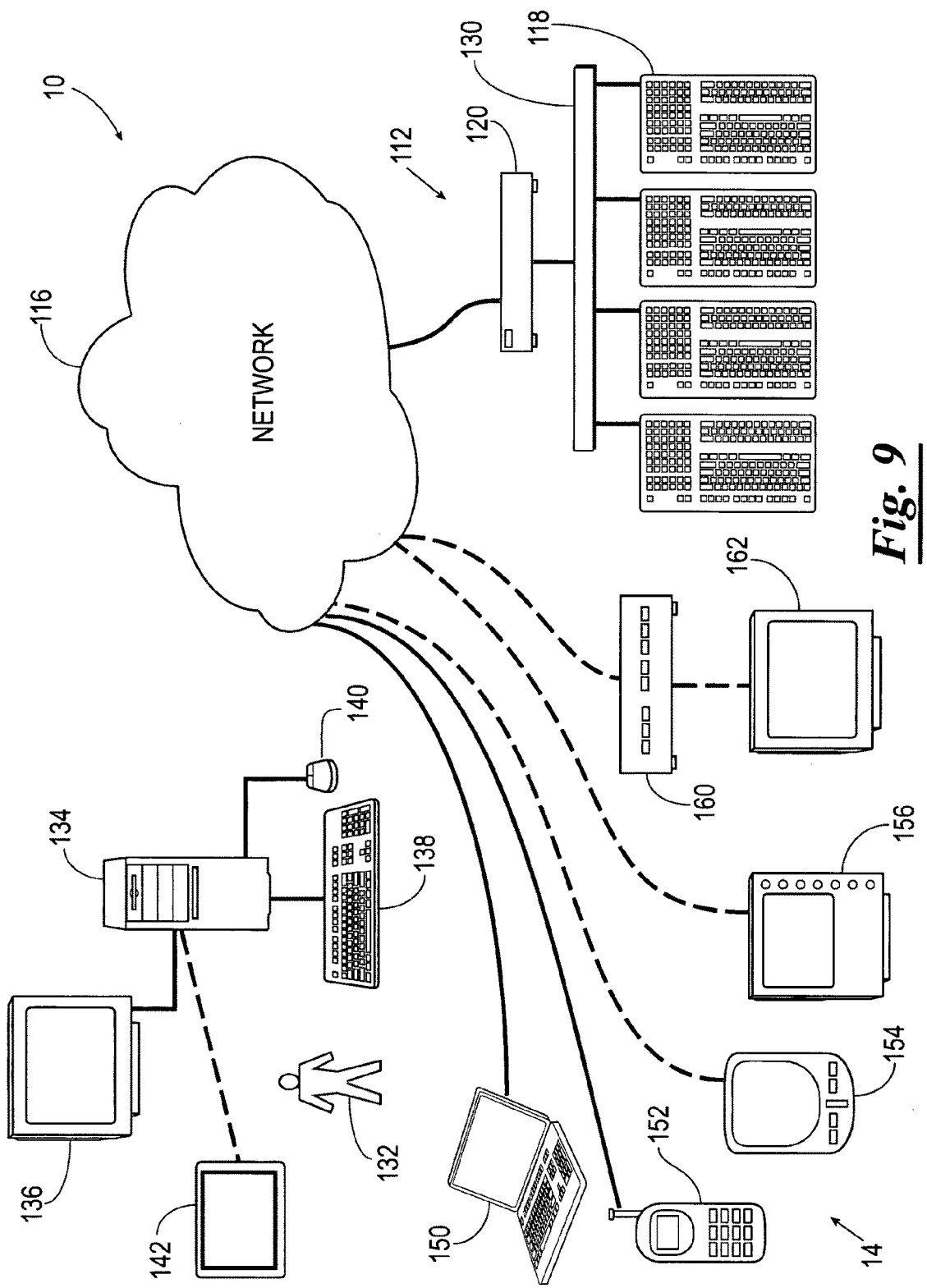

SYSTEMS AND METHODS FOR RAPID THREE-DIMENSIONAL MODELING WITH REAL FAÇADE TEXTURE

CROSS-REFERENCE TO RELATED APPLICATIONS

Not Applicable.

STATEMENT REGARDING FEDERALLY SPONSORED RESEARCH OR DEVELOPMENT

Not Applicable.

THE NAMES OF THE PARTIES TO A JOINT RESEARCH AGREEMENT

Not Applicable.

REFERENCE TO A "SEQUENCE LISTING," A TABLE, OR A COMPUTER PROGRAM LISTING APPENDIX SUBMITTED ON A COMPACT DISC AND AN INCORPORATION-BY-REFERENCE OF THE MATERIAL ON THE COMPACT DISC (SEE §1.52(E)(5))

Not Applicable.

BACKGROUND OF THE INVENTION

Technology advancements within the three-dimensional modeling industry are providing avenues for physical simulation of real-life and hypothetical situations on computer systems. These models can provide valuable information for strategic and tactical planning. For example, three-dimensional models of city streets can provide first responders information regarding current city developments including entryway locations, building recognition, and the like. This information is valuable in reducing response time during emergency conditions. Further, emergency personal can train for emergency situations through simulated scenarios provided by or with the three-dimensional models.

Currently within the art, oblique images obtained from aerial photographs are used to provide close-to-accurate representations of each building's surface within the three-dimensional model. However, generally, it is difficult to obtain these oblique images with unobstructed views of the building's surface. For instance, most buildings in downtown regions of a major metropolitan city are close in proximity to one another. It becomes burdensome and time consuming to capture aerial images of each building without an obstruction, such as a neighboring building. Further, finding a single image without obstructions from the thousands of aerial images obtained, would be extremely time consuming and cost-prohibitive and may require three-dimensional modeling of all obstructing structures.

Some three-dimensional models edit the obstructed portion of the oblique image by approximating the building's surface using other portions of the same building. Although this method does provide a representation of the building within the three-dimensional model, the representation goes on the assumption that all portions of the building are created equal. However, this assumption is problematic as an obstructed area may have uniquely placed doorways and/or windows that may be ignored by the approximation.

Alternatively, a user can manually manipulate two or more oblique images to form a single image having an unobstructed view of the façade. This type of manual manipulation is slow and tedious, and requires experience and expertise in the modeling field.

BRIEF SUMMARY OF THE INVENTION

In one embodiment, the present invention is related to a method of automatically generating a three-dimensional model of a structure. The three-dimensional model of the structure preferably includes real façade textures obtained from geo-referenced oblique images. The geographical position of the real façade texture is provided using wire-frame data. A base oblique image is selected from geo-referenced oblique images using the geographical positions obtained from the wire-frame data. The base oblique image is selected from the geo-referenced oblique images based on analysis of the image raster content of the real façade texture, and the real façade texture of the base oblique image is then applied to the three-dimensional model.

In one version, the real façade texture is analyzed to locate at least one occlusion. Occlusions can include obstructions in the view of the real façade texture such as an overlapping building, image distortions within the base oblique images, and/or the like. Occlusions may be located using pattern recognition, contrast, and/or the like. Unoccluded image characteristics of the real façade texture are provided by at least one geo-referenced oblique image. The unoccluded image characteristics of the occlusion are applied to the real façade texture to form a mosaic image.

In another version, the real façade texture is analyzed and corrected for misalignment. Misalignment may be corrected by shrinking and/or stretching the real façade texture, extracting portions of the real façade texture, and/or the like. For example, the outer boundaries of the real façade texture may be extracted using discontinuities in depth, discontinuities in surface orientation, variations in scene illumination, and/or the like.

In another version, the wire-frame data of the three-dimensional model is analyzed to locate the geographical position of a roof of the structure. Images containing the roof are provided and a base image is selected and applied to the three-dimensional model. The images may be nadir images or oblique images. Selection of the base image is based on the image raster content, for example, a base image may be preferred in which the image raster content contains a greater proportion of pixels associated with the roof as compared with other base images.

In another embodiment, the present invention is related to a method of automatically generating a three-dimensional model having structures with real façade textures. The real façade textures are obtained from geo-referenced aerial oblique images. Wire-frame data is analyzed to locate geographical positions of the real façade textures of the structures within a geographical area. An oblique image showing the real façade texture is selected. Where present, at least one incorrect area within at least a portion of the real façade texture may be identified. The incorrect area within the portion of the real façade texture is automatically corrected.

BRIEF DESCRIPTION OF THE SEVERAL VIEWS OF THE DRAWING

So the above-recited features and advantages of the present invention may be understood in detail, a more particular description of the invention, briefly summarized above, may be had by reference to the embodiments thereof that are illustrated in the appended drawings. It is to be noted, however, that the appended drawings illustrate only typical embodiments of this invention and are therefore not to be considered limiting in scope, for the invention may admit to other equally-effective embodiments.

FIG. 9 is a schematic diagram of an exemplary embodiment of a system for providing three-dimensional models having real façade textures in accordance with the present invention.

DETAILED DESCRIPTION OF EXEMPLARY EMBODIMENTS

Figure 1:
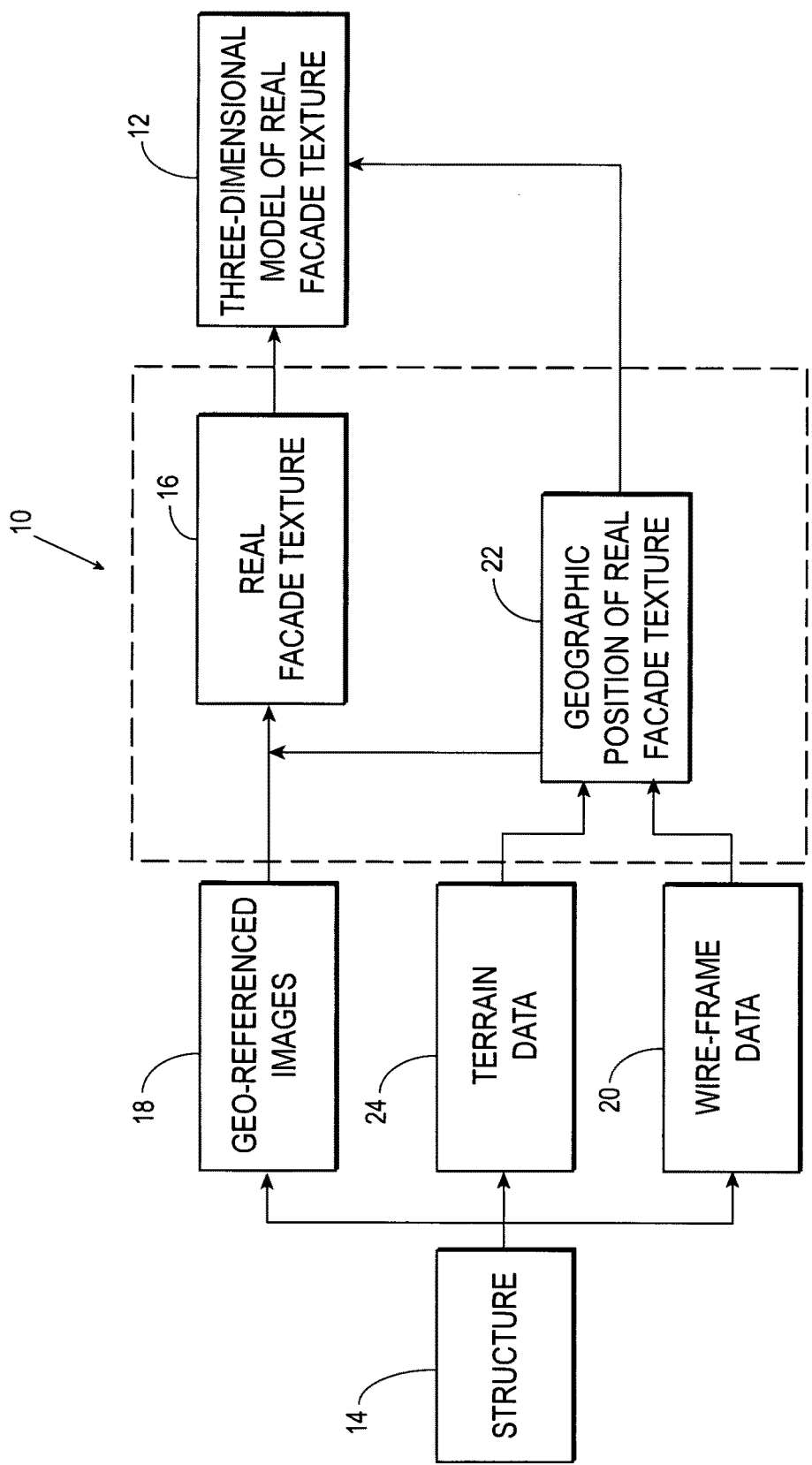
FIG. 1 is a block diagram of one embodiment of the rapid three-dimensional modeler system having real-façade textures obtained from geo-referenced images in accordance with the present invention.

Embodiments of the invention are shown in the above-identified Figures and described in detail below. In describing the embodiments, like or identical reference numerals are used to identify common or similar elements. The Figures are not necessarily to scale and certain features and certain views of the Figures may be shown exaggerated in scale or in schematic in the interest of clarity and conciseness.

Figure 2:
FIG. 2 is a pictorial representation of a three-dimensional model having real façade textures.

Referring now to the drawings and in particular to FIGS. 1 and 2, shown therein and designated by a reference numeral 10 is an exemplary system for rapidly creating a three-dimensional model 12 of a structure 14 including real façade textures 16. The system 10 provides real façade textures 16 obtained from geo-referenced images 18. The three-dimensional model 12, including the real façade textures 16, provides an accurate representation of a geographic area. An exemplary three-dimensional model 12 is shown in FIG. 2 and preferably includes structures such as buildings, thoroughfares, and other associated fixtures. Such features provide real-life representation of the geographical area useful in strategic planning, tactical planning, tactical debriefing, simulation, real-time simulation, first response actions, engineering designs, and/or the like. Although the geographic area applies to physical characteristics of an area, it is not limited to the topographical features of the Earth's surface. For example, the system and methods described herein may apply to rapid three-dimensional modeling techniques for medical imaging.

Generally, the system 10 identifies a geographical position 22 of at least one real façade texture 16 of the structure 14. The system 10 locates geo-referenced images 18 containing the real façade texture 16 and selects a base image 19 (See FIG. 7) having optimal image characteristics of the real façade texture 16. This base image 19 provides at least one real façade texture applied to the structure 14 forming the three-dimensional model 12.

Figure 3:
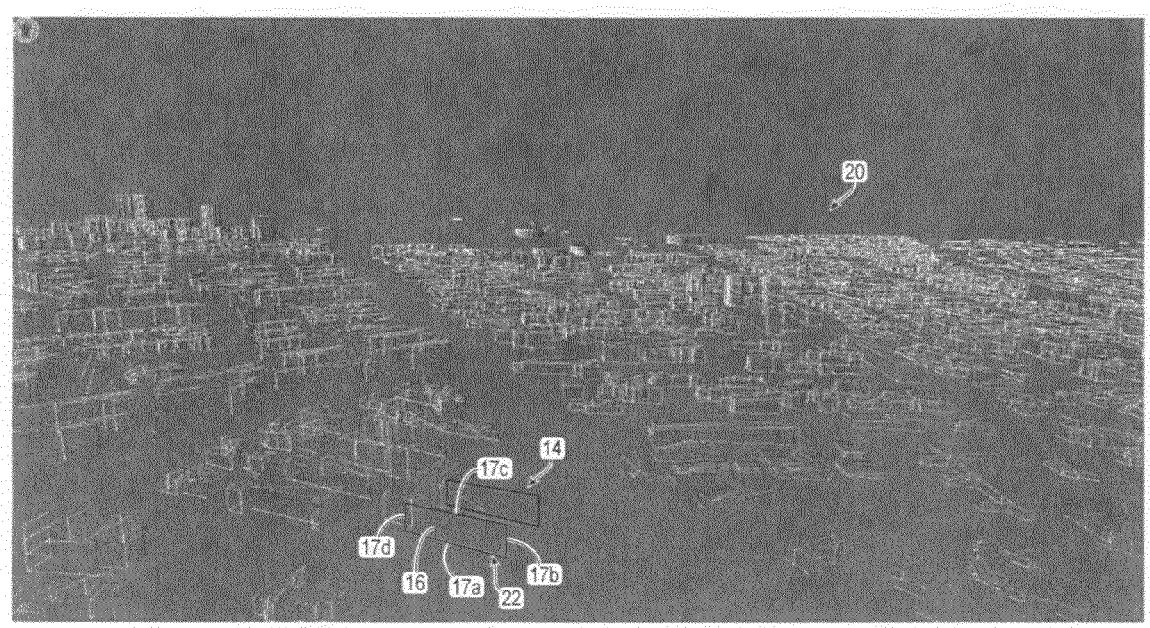
FIG. 3 is a pictorial representation of wire-frame data providing a geographical position of a real façade texture of a structure.

The system 10 identifies the geographical position 22 of the real façade textures 16 within the geo-referenced images 18. In one embodiment, the system 10 uses wire-frame data 20 of the structure 14 to provide the geographical position 22 through the identification of boundaries (17a, 17b, 17c, 17d . . . ) of the real façade texture 16, as best illustrated in FIG. 3. Although the wire-frame data 20 of FIG. 3 illustrates boundaries 17a-17d of the real façade texture 16 as a rectangle, it will be appreciated by one skilled in the art, the boundaries 17a-17d may comprise a circle, square, triangle, or any fanciful shape. Alternatively, an edge-detection algorithm may be used to locate the geographical position 22 of the real façade texture 16 within the wire-frame data. Preferably, wire-frame data 20 is obtained from publicly available information of buildings, structures, elevations and the like. For example, publicly available wire-frame data 20 commonly stored as *.shp files may be used. Alternatively, wire-frame data 20 of the structure 14 may be created based on the particular application of the present invention using techniques commonly known within the art.

Figure 4:
FIG. 4 is a pictorial representation of terrain data providing a geographical position of a real façade texture of a structure.

The system 10 may also use terrain data 24 to provide the geographical position 22 of the real façade texture 16. For example, the system may identify boundaries (17a, 17b, 17c, 17d . . . ) of the real façade texture 16 as illustrated in FIG. 4. Although FIG. 4 illustrates boundaries 17a-17d of the real façade texture 16 as a rectangle, it will be appreciated by one skilled in the art, the boundaries 17a-17d may comprise a circle, square, triangle, or any fanciful shape. Alternatively, an edge-detection algorithm may be used to locate the geographical position 22 of the real façade texture 16 within the terrain data. Terrain data may include Digital Terrain Models (DTMs), Digital Elevation Models (DEMs), and/or the like. Generally, terrain data 24 is comprised of sets of universal terrain map coordinates identifying location and elevation of geographical regions. The coordinate system may be any coordinate system including latitude and longitude or any other geographical coordinate system suitable for use with the present invention. Preferably, the terrain data 24 is a publicly available Digital Terrain Model. Alternatively, terrain data 24 for a geographical area may be extracted or created from publicly available contour images, and/or may be created for the specific application intended.

Figure 5:
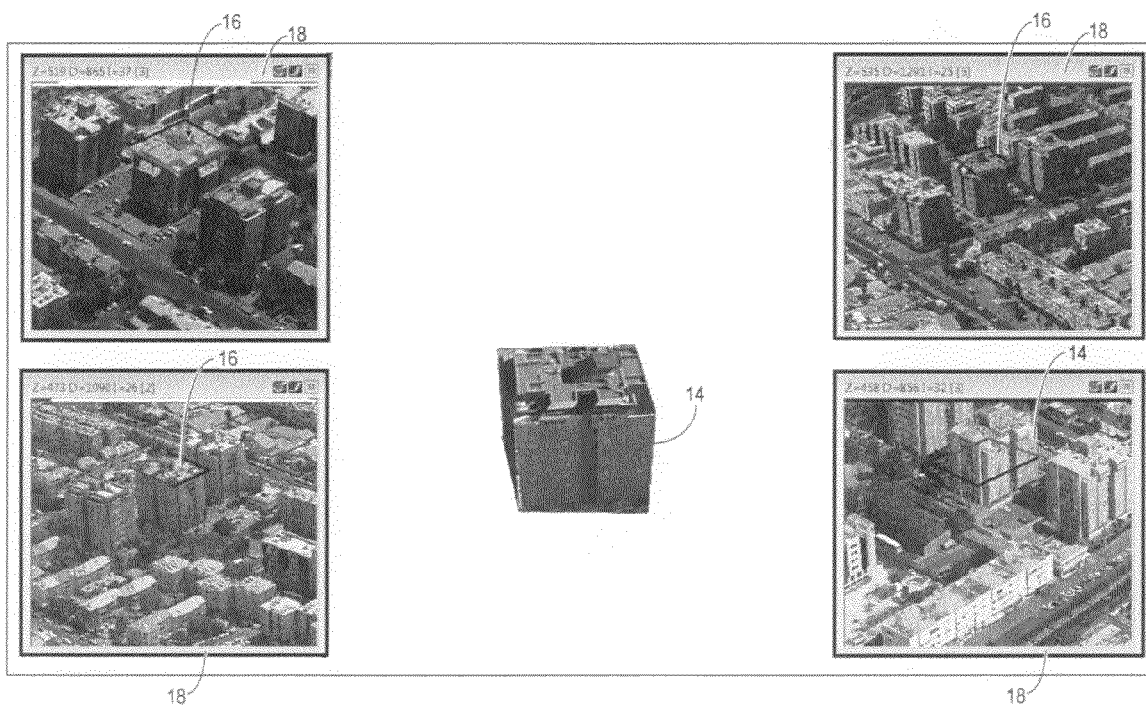
FIG. 5 is a pictorial representation of an exemplary oblique image obtained from an aerial camera, the oblique image displaying a real façade texture of a structure.

The geo-referenced image 18 providing the real façade texture 16, as illustrated in FIG. 5, may use any color space and be stored in any industry supported file format, such as TIFF, JPEG, GIF, BMP, ECW, and/or the like. Additionally, the geo-referenced images preferably contain or are referenced to or coordinated with information regarding the location and orientation of the camera, focal length, the physical size of the sensor, and/or the like.

The geo-referenced images 18 are preferably nadir images and/or oblique images. Nadir images, as described herein, provide vertical or orthogonal views of the geographic area. Nadir images may be an image captured from an overhead position, a position above the structure 14, or at a right angle or an angle near to a right angle to the structure 14. For example, the image may be taken from an overhead position as related to the structure 14 at an eighty-seven degree angle or similar angle close to a ninety-degree angle. A nadir image may be rectified to fit an associated wire-frame, DTM, DEM, and/or the like. Rectifying a nadir image may entail mapping the pixels to the coordinates of the wire-frame, DTM, DEM, and/or the like.

As nadir images typically do not express the details and characteristics of structures and objects, in the currently preferred embodiment, oblique images will typically, but not exclusively, be used for the purposes of the present invention. Oblique images, as described herein, are images taken at an angle other than that of the nadir perspective or images derived from the nadir perspective. Oblique images provide a perspective line of sight that generally reveals information not visible from an orthogonal or orthophoto view. For example, an oblique image may have an angle to the structure 14 in the range of about zero degrees to about eighty-nine degrees.

Figure 6:
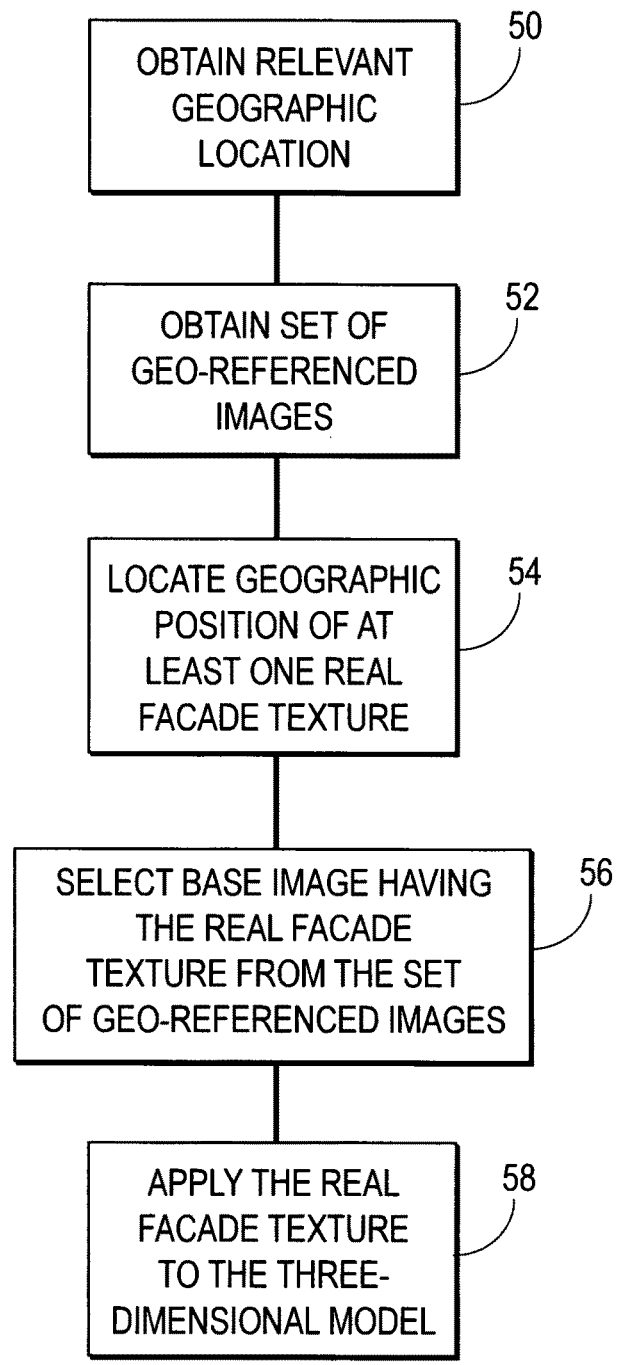
FIG. 6 is an exemplary function flow chart of a method for generating a three-dimensional model of a structure including real façade textures obtained from geo-referenced images.

Referring to FIGS. 1 and 6, the first step 50 in generating a three-dimensional model having real façade textures 16 is to obtain a relevant geographic location of the structure 14. Once the geographic location is determined, a set of geo-referenced images 18 representing the location are obtained, which is the second step 52. The geo-referenced images 18 may be obtained as discussed above or in any other suitable fashion. The relevant geographical location 22 may be determined internally, calculating a position based upon a mathematical formula, or through an external entity, for example, by a database or user. Preferably, a user indicates an initial geographic location, for example, such that subsequent locations may be mathematically calculated using image boundaries.

The third step 54 is to locate the geographical position 22 of at least one real façade texture 16 of the structure 14. Wire-frame data 20 and/or terrain data may be used to locate the geographical position 22 coordinating to the structure 14 as previously discussed herein.

The fourth step 56 is to select a base image 19 containing the real façade texture 16 from the geo-referenced images 18. The base image 19 is preferably selected as one that accurately represents the real façade texture 16 and may be automatically selected by the system 10 or selected or determined by the user from a limited selection of geo-referenced images 18 provided by the system 10.

The base image 19 containing the real façade texture 16 is selected from the geo-referenced images 18 of the structure 14 based upon a factorial analysis of the image raster content of each geo-referenced image 18 of the structure 14. The factorial analysis may include a weighted determination based on the resolution of the image, colour depth of the image, proportional size of the real façade texture, contrast, time of day the image was captured, time of year the image was captured and/or the like. Foliage may also play a role in the factorial analysis. For example, the base image 19 may be selected based on the contrast in lighting conditions. Contrast may be measured as a histogram and provide information regarding shadows within the image. Such information is relevant in constructing replications of large geographical areas, as the three-dimensional model 12 would generally include real façade textures 16 representing the same approximate time of day and/or time of year.

The fifth step is to apply or relate the real façade texture 16 of the base image 19 to the three-dimensional model 12. The three-dimensional model 12 may comprise base factors such as wire-frame data and/or terrain data. For example, the real façade texture 16 of the base image 19 may be applied to the wire-frame of the structure 14. The system 10 may automatically rotate, stretch, or shrink the real façade texture 16 to align with edges of the wire-frame data 20. Additionally, the system 10 may provide for user evaluation and/or manipulation of the real façade texture 16.

Alternatively, wire-frame data 20 and/or terrain data 22 may provide a coordinate system for the three-dimensional model 12 such that the real façade texture 16 is geographically positioned within the three-dimensional model according to the corresponding coordinates of the wire-frame data and/or terrain data. Additionally, the real façade texture 16 may be applied to form the entire three-dimensional model 12 or, alternatively, at least a portion of the three-dimensional model 12. Multiple base images 19 with multiple real façade textures 16 may form the three-dimensional model 12.

Figure 7:
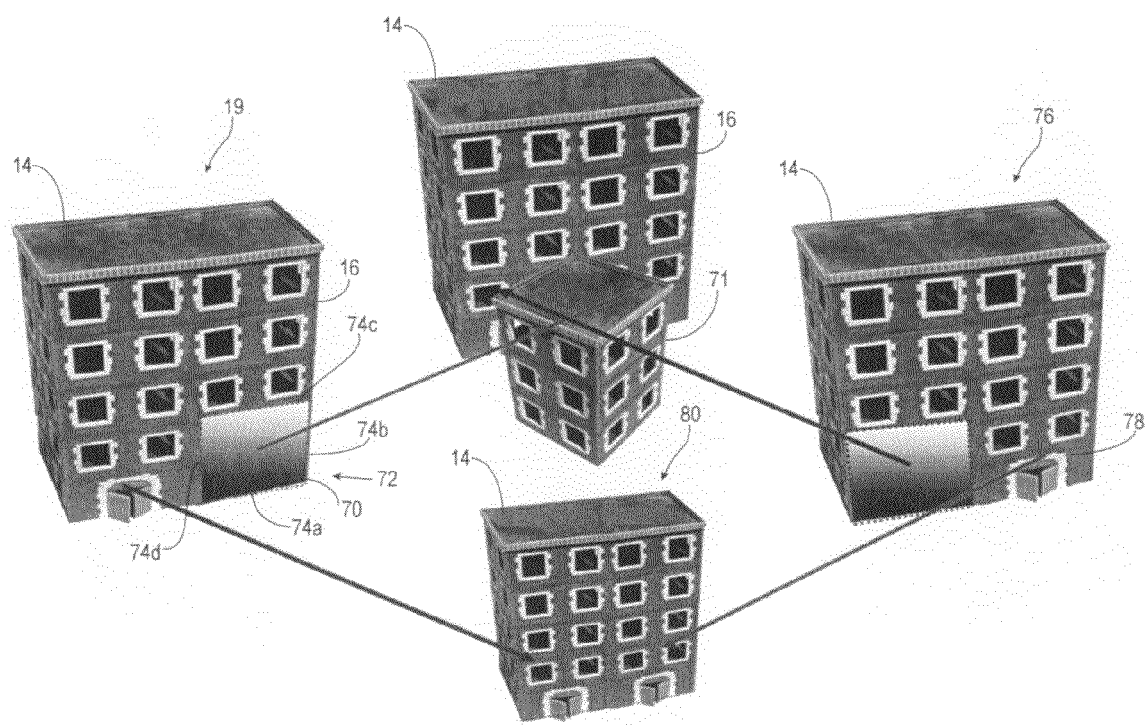
FIG. 7 is a schematic block diagram of the formation of a mosaic image from a base image and a geo-referenced image including an unoccluded image characteristic.
Figure 8:
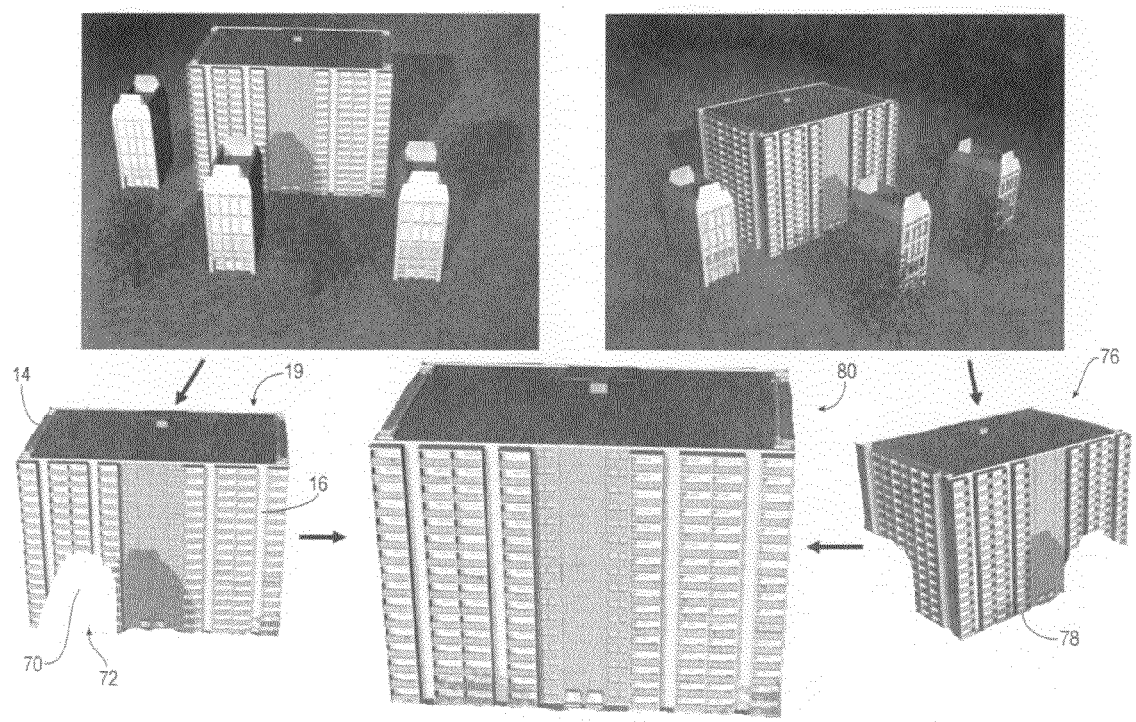
FIG. 8 is a schematic block diagram of the formation of a mosaic image from a base image and a geo-referenced image including an unoccluded image characteristic, the base image and the geo-referenced image having different views.

In another embodiment, the real façade texture may be further processed to correct occlusions 70, as illustrated in FIGS. 7 and 8. Generally, it is difficult to provide the real façade texture 16 of the base image 19 of the structure 14 without occlusions 70 such as overlapping structures, visual distortions, and/or the like. For example, FIG. 7 illustrates the real façade texture 16 blocked by an overlapping structure 71. This blocked overlapping structure 71 causes an occlusion 70 within the real façade texture 16. Multiple geo-referenced images 18 may not be able to provide the real façade texture 16 without the blocked overlapping structure 71. Therefore, methods are provided to correct for the occlusion 70 within the real façade texture 16.

To correct for the occlusion 70 within the real façade texture 16, the base image 19 is analyzed to locate a geographical position 72 of the occlusion 70. For example, the geographical position 72 may be identified using boundaries (74a, 74b, 74c, 74d . . .). Although the boundaries 74a-74d are illustrated as a rectangle, it will be appreciated by one skilled in the art, the boundaries 74a-74d may comprise a circle, square, triangle, or any fanciful shape. Additionally, an edge-detection algorithm may be used to identify the geographical position of the occlusion 70.

Once the geographical position 72 of the occlusion 70 is located, the geo-referenced images 18 of the structure 14 are analyzed to locate at least one image 76 having an unoccluded image characteristic 78. As illustrated in FIG. 7, the geo-referenced images 18 of the structure 14 correcting for the occlusion 70 are not required to be the same view as the base image 19.

The unoccluded image characteristic is applied to the real façade texture 16 forming a mosaic image 80. For example, pixels of the unoccluded image characteristic 78 may replace pixels of the occlusion 70 of the real façade texture 16. The mosaic image 80 may include several unoccluded image characteristics 78 in addition to the real façade texture 16 of the base image 19.

Storage of the mosaic image 80 may be problematic if the file size of the mosaic image 80 is extremely large. Thus, it may be beneficial to use an algorithm for storing the mosaic image 80. For example, a rectangular area of the mosaic image 80 can be extracted and all information outside of the rectangular space cropped and removed. However, the geo-referencing information of the area would still be maintained within the mosaic image 80.

Occlusions 70 are not limited to blocked areas on the real façade texture 16 but can also include misalignment of the real façade texture 16 when applied to the three-dimensional model 12 and/or undesirable background images within the real façade texture 16. Occlusions 70, misalignments, and background images may be identified using pattern recognition, contrast, and/or the like. For example, pattern recognition technically can be used to analyze each pixel or a group of pixels to determine whether the pixel belongs to the real façade texture 16 or is part of the occlusion 70. The three-dimensional geometry of the surrounding buildings may also be a key factor.

Additionally, the real façade texture 16 may be optimized for depth complexity. Methods for optimizing depth complexity involve the system 10 first determining whether overlapping elements within the real façade texture 16 are occlusions 70 or desirable features of the real façade texture 16. If the system 10 determines the overlapping elements are desirable features of the real façade texture 16, the system 10 applies the real façade texture 16 of the overlapping structures to the three-dimensional model. For example, the system 10 may detect a small roof structure that is overlapping a large roof structure. The system 10 will assume that the small roof structure is an element on top of the large roof structure and considered desirably within the real façade texture 16. The system will apply the real façade texture 16 of the overlapping structures to the three-dimensional model 12. Depth complexity analyses the geometry of overlapping 3D structures, such as a small room on a large roof. Usually, walls are represented by vertical rectangles, from the top of the roof to the terrain. In this case, walls of the small room are created only to the large roof and not to the terrain.

The formation of the three-dimensional model 12 with real façade textures 16 may be a continuous or intermittent process. Preferably, the formation of the three-dimensional model 12 is automatically performed by the system 10 to facilitate rapid modeling of an area. Using the methods as described herein, the system 10 determines the geographic location of an area of interest and retrieves the appropriate wire-frame data 20 and/or terrain data 24 associated with the area. The system 10 automatically locates and identifies structures 14 within the area based upon the wire-frame data 20 and/or terrain data 24 provided. Geo-referenced images 18 of the area are located by the system 10 using the wire-frame data 20 and/or terrain data 24. The base oblique image 19 of the structure 14 is automatically selected by the system 10 based on the image raster content of each of the geo-referenced images 18. If the base oblique image 19 contains more than one structure 14, the system 10 may locate each real façade texture 16 independently or together. Once the real façade texture 16 is located, the system 10 may fix any occlusions if necessary and apply the real façade texture to the three-dimensional model 12.

Generally, the system 10 is a computer system that is able to embody and/or execute the logic of the processes described herein. The logic embodied may be executed on any appropriate hardware such as, for example, a dedicated system or systems, personal computer system, distributed processing computer system, and/or the like.

Referring now to FIG. 9, the system 10 is preferably distributed, and includes a host system 112, communicating with one or more user devices 114 via a network 116. The network 116 can be the Internet or other network. In either case, the host system 112 typically includes one or more servers 118 configured to communicate with the network 116 via one or more gateways 120. When the network 116 is the Internet, the primary user interface of the system 10 is delivered through a series of web pages, but the primary user interface can be replaced by another type of interface, such as a Windows-based application. This method is also used when deploying the system 10 in a stand-alone environment, such as a kiosk.

The network 116 can be almost any type of network, although Internet and Internet 2 networks are preferred because of the wide support of their underlying technologies. One embodiment of the network 116 exists in an Internet environment, which means a TCP/IP-based network. It is conceivable that in the near future, the preferred or other embodiments, may wish to use more advanced networking topologies.

The servers 120 can be networked with a LAN 130. The gateway 120 is an entity responsible for providing access between the LAN 130 and the network 116. The gateway 120 can also be used as a security means to protect the LAN 130 from attack from external networks such as the network 116.

The LAN 130 network can be based on TCP/IP network such as the Internet, or it can based on another underlying network transport technology. The preferred embodiment uses an Ethernet network with TCP/IP because of the availability and acceptance of underlying technologies, but other embodiments may use other types of networks such as Fibre Channel, SCSI, Gigabit Ethernet, etc.

As discussed above, in one embodiment, the host system 112 includes the servers 118. The configuration of the server hardware will depend upon the requirements and needs of the particular embodiment of the system 10. Typical embodiments, including the preferred embodiment, will include multiple servers 118 with load balancing to increase stability and availability. It is envisioned that the servers 118 will include database servers and application/web servers. The database servers are preferably separated from the application/web servers to improve availability and to provide the database servers with improved hardware and storage.

The user devices 14 can be any number and type of device. Generally, user devices 14 involve a user 32, using a computer 34 with a display 36, keyboard 38, and mouse 40. It is contemplated user devices 14 may include a touch screen element on the display in addition to or in lieu of the keyboard 38 and/or mouse 40.

Typically, the user device 14 uses a type of software called a "browser" as indicated by reference numeral 42 to render HTML/XHTML content that is generated when requesting resources from a source, such as the host system 112. In the preferred embodiment, the system 10 is designed to be compatible with major Web Browser vendors (Microsoft Internet Explorer, Netscape Navigator, and Opera). Other embodiments may wish to focus on one particular browser depending upon the common user base using the system 10. It should be noted, user devices 14 may interact with the system 10 through any suitable functional software, such as a program specifically designed for the individual embodiments of the system 10.

The user devices 14 can also be implemented as a portable device such as a laptop computer 150 (or handheld computer); a cellular telephone 52 with a micro or embedded Web Browser; a Portable Digital Assistant 54 (PDA) capable of wireless network access; a pen-based or tablet computer 56, and/or the like. In another embodiment, the user device 14 may be a cable box 60 or other similar device for viewing through a display 62 or television. Current embodiments of the system 10 can also be modified to use any of these or similar future developed devices.

The system 10 is designed to provide flexibility in its deployment. Depending upon the requirements of the particular embodiment, the engine may be designed to work in almost any environment such as a desktop application, a web application, a series of web services designed to communicate with an external application, and/or the like.

The hardware and system software are designed with two key concerns: flexibility and scalability. Although some specifics for software and hardware components are described herein, it will be understood that a wide array of different components may be substituted. For example, different database vendors may be used, SML-based document stores may be used, and/or the like.

When the system 10 is used to execute the logic of the processes described herein, such computer(s) and/or execution may be conducted at a same geographical location or multiple geographic locations. Furthermore, the execution of the logic may be conducted continuously or at multiple discrete times.

The system 10 includes one or more computer readable medium storing instructions for displaying a pixel representation of one or more of the images described herein including the geo-referenced images 18, the base oblique images 19, wire frame data 20, terrain data 24, the three-dimensional model 12, and the like. The computer readable medium may be part of the host system 112, the user devices 114, or combination thereof. Additionally, the system 10 uses one or more databases or servers 118 to store the images in an organized format. For example, the geo-referenced images 18 of the structure 14 may be sorted and stored by the direction showing the particular real façade texture 16.

The system 10 may also include instructions for (1) displaying pixel representations of the images as described above; (2) selecting the geographical location of interest; (3) altering and/or editing images; and (4) other similar tasks. The instructions typically run on a combination of the user devices 114 and the host system 12.

Although the foregoing invention has been described in some detail by way of illustration and example for purposes of clarity of understanding, it will be obvious to those skilled in the art that certain changes and modifications may be practiced without departing from the spirit and scope thereof, as described in this specification and as defined in the appended claims below.

What is claimed is:

1. A method for automatically generating a three-dimensional model of a structure including real façade textures obtained from geo-referenced oblique images, comprising the steps of:
    using a computer system to perform the steps of:
    analyzing wire-frame data of the three-dimensional model of the structure to locate geographical positions of at least one real façade texture of the structure;
    for each of plural geographical positions:
        locating multiple oblique images containing the real façade texture of the structure for the geographical position;
        selecting a base oblique image from the multiple oblique images by analyzing, with selection logic, image raster content of the real façade texture of the multiple oblique images, the selection logic using factorial analysis of the image raster content; and,
        applying the real façade texture of the base oblique image to the three-dimensional model.

2. The method of claim 1, further comprising the steps of:
    using the computer system to perform the steps of:
    analyzing the real façade texture to locate geographical positions of at least one occlusion;
    locating at least one oblique image having an unoccluded image characteristic of the occlusion in the real façade texture; and,
    applying the unoccluded image characteristic to the real façade texture forming a mosaic image.

3. The method of claim 2, wherein the occlusion is located using pixel pattern recognition of the real façade texture.

4. The method of claim 2, wherein the oblique images are geo-referenced solved oblique images.

5. The method of claim 2, further comprising the step of removing the occlusion from the real façade texture.

6. The method of claim 1, further comprising the step of extracting the real façade texture from the base oblique image, the real façade texture having geo-referenced information.

7. The method of claim 1, further comprising the steps of:
    using the computer system to perform the steps of:
    analyzing wire-frame data to locate the geographical position of a roof of the structure;
    locating images containing the roof;
    selecting a base image from the images containing the roof by analyzing image raster content; and,
    applying the roof to the three-dimensional model.

8. The method of claim 7, wherein the images containing the roof are nadir images.

9. The method of claim 7, wherein the images containing the roof are oblique images.

10. The method of claim 7, wherein the images containing the roof are nadir images and oblique images.

11. The method of claim 7, wherein the base image contains a greater proportion of pixels associated with the roof as compared with other oblique images.

12. The method of claim 1, wherein the oblique images are geo-referenced solved oblique images.

13. The method of claim 1, further comprising the step of correcting misalignment of the real façade texture.

14. The method of claim 13, wherein the misalignment is corrected using an edge-detection algorithm.

15. The method of claim 1, further comprising the step of aligning the real façade texture to the wire-frame data of the three-dimensional model.

16. The method of claim 1, further comprising the step of aligning the wire-frame data to the façade.

17. A method for automatically generating a three-dimensional model of structures including real façade textures obtained from geo-referenced aerial oblique images, comprising the steps of:
    using a computer system to perform the steps of:
    analyzing wire-frame data to locate geographical positions of real façade textures of the structures within a geographical area;
    choosing an oblique image showing the real façade texture, comprising the steps of:
        for each of plural geographical positions:
            locating multiple oblique images containing the real façade texture of the structure for the geographical position;
            selecting a base oblique image from the multiple oblique images by analyzing, with selection logic, image raster content of the real façade texture of the multiple oblique images, the selection logic using factorial analysis of the image raster content; and,
            applying the real façade texture of the base oblique image to the three-dimensional model;
    identifying an occlusion within the part of the real façade texture;
    automatically correcting the occlusion within the part of the real façade texture by the steps of:
        determining a geographical position of the occlusion;
        locating at least one image having an unoccluded image characteristic; and
        applying the unoccluded image characteristic to the real façade texture to form a mosaic image.

* * * * *